US011112602B2

(12) United States Patent
Huang et al.

(10) Patent No.: US 11,112,602 B2
(45) Date of Patent: Sep. 7, 2021

(54) METHOD, APPARATUS AND SYSTEM FOR DETERMINING LINE OF SIGHT, AND WEARABLE EYE MOVEMENT DEVICE

(71) Applicant: BEIJING 7INVENSUN TECHNOLOGY CO., LTD., Beijing (CN)

(72) Inventors: Tongbing Huang, Beijing (CN); Yang Fu, Beijing (CN)

(73) Assignee: BEIJING 7INVENSUN TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/669,473

(22) Filed: Oct. 30, 2019

(65) Prior Publication Data
US 2020/0150427 A1    May 14, 2020

(30) Foreign Application Priority Data
Nov. 14, 2018    (CN) .......................... 201811354296.1

(51) Int. Cl.
*G02B 27/00*    (2006.01)
*G06F 3/01*    (2006.01)
(Continued)

(52) U.S. Cl.
CPC ......... *G02B 27/0093* (2013.01); *B60W 30/09* (2013.01); *G02B 27/0172* (2013.01);
(Continued)

(58) Field of Classification Search
CPC ........... G02B 27/0093; G02B 27/0172; G02B 27/0179; G02B 2027/0181;
(Continued)

(56) References Cited

U.S. PATENT DOCUMENTS 3,917,412 A    11/1975 Stoutmeyer
5,942,954 A    8/1999 Galiana
(Continued)

FOREIGN PATENT DOCUMENTS

KR    20160071360 A    6/2016
WO    WO-2019010959 A1 *    1/2019    ......... G06K 9/00604

OTHER PUBLICATIONS

The extended European Search Report of corresponding European application No. 19 20 7178, dated Dec. 19, 2020.
First Office Action of the parallel AU application.

*Primary Examiner* — Bryan Earles
(74) *Attorney, Agent, or Firm* — J.C. Patents

(57) ABSTRACT

The present disclosure discloses a method, an apparatus and a system for determining line of sight, and a wearable eye movement device. The method includes: acquiring first gaze information of a user relative to a line of sight tracking module, where the line of sight tracking module closes to the user and moves with the user; acquiring a relative parameter between the line of sight tracking module and a fixed object; and determining second gaze information corresponding to the first gaze information according to the relative parameter. The present disclosure solves the technical problem that that the line of sight of the driver cannot be accurately determined in the prior art.

16 Claims, 2 Drawing Sheets

(51) Int. Cl.
*G02B 27/01* (2006.01)
*B60W 30/09* (2012.01)
*G06K 9/00* (2006.01)

(52) U.S. Cl.
CPC ......... *G02B 27/0179* (2013.01); *G06F 3/013* (2013.01); *G06K 9/00845* (2013.01); *G02B 2027/0181* (2013.01); *G02B 2027/0183* (2013.01); *G02B 2027/0187* (2013.01)

(58) Field of Classification Search
CPC ... G02B 2027/0183; G02B 2027/0187; B60W 30/09; G06F 3/013; G06K 9/00845
See application file for complete search history.

(56) References Cited

U.S. PATENT DOCUMENTS

| | | | |
|---|---|---|---|
| 6,091,334 A | 7/2000 | Galiana | |
| 7,401,920 B1 | 7/2008 | Kranz | |
| 10,216,270 B2 * | 2/2019 | Tsuda | B60K 35/00 |
| 2008/0136916 A1 | 6/2008 | Wofll | |
| 2012/0293773 A1 | 11/2012 | Publicover | |
| 2015/0194035 A1 * | 7/2015 | Akiva | H04N 7/183 340/575 |
| 2016/0173865 A1 | 6/2016 | Park | |

* cited by examiner

METHOD, APPARATUS AND SYSTEM FOR DETERMINING LINE OF SIGHT, AND WEARABLE EYE MOVEMENT DEVICE

CROSS-REFERENCE TO RELATED APPLICATIONS

This application claims priority to Chinese Patent Application No. 201811354296.1, filed on Nov. 14, 2018, which is hereby incorporated by reference in its entirety.

TECHNICAL FIELD

The present disclosure relates to, but is not limited to, the field of computer, and in particular, to a method, an apparatus and a system for determining line of sight, and a wearable eye movement device.

BACKGROUND

The existing eye tracker for vehicles is generally fixed near the dashboard of the vehicle, configured to detect the line of sight of the driver, and the eye tracker generally performs line of sight tracking by collecting eye movement data. The common eye tracker uses an infrared illumination device to illuminate the driver's eye to create a glint on the driver's cornea, and then uses these glints and the driver's pupil picture to calculate gaze direction of the driver.

However, the eye tracker is set near the vehicle dashboard, which will make the eye tracker far away from the driver. In the process of the line of sight detection, disturbance factors such as ambient stray light will cause great interference to the line of sight detection. In addition, since the shooting range of the image capturing apparatus for shooting the eye movement set on the eye tracker is limited, there is a certain requirement for the position stability of the driver during the line of sight detection process. Once the driver deviates from the predetermined detection range for some reason, the line of sight detection of the driver will not be successfully completed.

In view of the above-mentioned prior art, it is impossible to accurately determine the line of sight of the driver, there is no effective solution proposed yet.

SUMMARY

Embodiments of the present disclosure provide a method, an apparatus and a system for determining line of sight, and a wearable eye movement device to at least solve the technical problem that the prior art cannot accurately determine line of sight of a driver.

According to an aspect of an embodiment of the present disclosure, a method for determining line of sight is provided, including: acquiring first gaze information of a user relative to a line of sight tracking module, where the line of sight tracking module is close to the user and capable of moving with the user; acquiring a relative parameter between the line of sight tracking module and a fixed object; and determining, according to the relative parameter, second gaze information corresponding to the first gaze information, where the second gaze information is gaze information of the user relative to the fixed object.

Further, the relative parameter includes: relative position information between the line of sight tracking module and the fixed object, and coordinate transformation angle information of the line of sight tracking module relative to the fixed object.

Further, the determining, according to the relative parameter, second gaze information corresponding to the first gaze information includes: determining a first reference system of the first gaze information, where the first reference system is configured to indicate line of sight of the user relative to the line of sight tracking module; converting the first reference system to a second reference system according to the relative parameter, where the second reference system is configured to indicate line of sight of the user relative to the fixed object; and determining, according to the second reference system, the second gaze information corresponding to the first gaze information.

Further, after the determining, according to the relative parameter, second gaze information corresponding to the first gaze information, the method further includes: determining whether the relative parameter and/or the second gaze information meets a predetermined condition; determining, if the relative parameter and/or the second gaze information does not meet the predetermined condition, that a posture of the user is incorrect, and generating a corresponding emergency command, where the emergency command is configured to control the fixed object.

Further, the determining whether the relative parameter and/or the second gaze information meets a predetermined condition includes at least one of: determining, according to the relative parameter, whether the user is in a first predetermined area, where determining, if the user is not in the first predetermined area, that the relative parameter does not meet the predetermined condition; counting a first duration that the user is not in the first predetermined area and determining whether the first duration is higher than a first time threshold according to the relative parameter, where determining, if the first duration is higher than the first time threshold, that the relative parameter does not meet the predetermined condition; determining, according to the second gaze information, whether line of sight of the user is in a second predetermined area, where determining, if the line of sight of the user is not in the second predetermined area, that the second gaze information does not meet the predetermined condition; and counting a second duration that the line of sight of the user is not in the second predetermined area and determining whether the second duration is higher than a second time threshold according to the second gaze information, where determining, if the second duration is higher than the second time threshold, that the second gaze information does not meet the predetermined condition.

Further, after the determining, according to the relative parameter, second gaze information corresponding to the first gaze information, the method further includes: determining, according to the second gaze information, a gaze point of the user; and generating, according to the gaze point a gaze point control instruction, where the gaze point control instruction is configured to control the fixed object.

According to another aspect of an embodiment of the present disclosure, an apparatus for determining line of sight is further provided, including: a first acquiring unit, configured to acquire first gaze information of a user relative to a line of sight tracking module, where the line of sight tracking module is close to the user and capable of moving with the user; a second acquiring unit, configured to acquire a relative parameter between the line of sight tracking module and a fixed object; and a first determining unit, configured to determine, according to the relative parameter, second gaze information corresponding to the first gaze information, where the second gaze information is gaze information of the user relative to the fixed object.

According to another aspect of an embodiment of the present disclosure, a wearable eye movement device is further provided, including: a line of sight tracking module, configured to acquire first gaze information of a user relative to the line of sight tracking module, where the line of sight tracking module is close to the user and capable of moving with the user; a positioning module, configured to acquire a relative parameter between the line of sight tracking module and a fixed object; and a processor, configured to determine, according to the relative parameter, second gaze information corresponding to the first gaze information, where the second gaze information is gaze information of the user relative to the fixed object.

According to another aspect of an embodiment of the present disclosure, a system for determining line of sight is further provided, including: a wearable eye tracker, configured to acquire first gaze information of a user relative to the wearable eye tracker, where the wearable eye tracker is close to the user and capable of moving with the user; a sensor, configured to acquire a relative parameter between is close to the user and capable of moving with the user and a fixed object; and a controller, configured to determine, according to the relative parameter, second gaze information corresponding to the first gaze information, where the second gaze information is gaze information of the user relative to the fixed object.

According to another aspect of an embodiment of the present disclosure, a storage medium is further provided, the storage medium includes a stored program, where the program, when it is running, controls the device in which the storage medium is located to perform the method for determining line of sight described above.

According to still another aspect of an embodiment of the present disclosure, a processor is further provided, the processor is configured to run a program, where the program, when it is executed, performs the method for determining line of sight described above.

In the embodiments of the present disclosure, the line of sight tracking module is close to the user and capable of moving with the user, the first gaze information of the user relative to the line of sight tracking module is acquired, and the relative parameter between the line of sight tracking module and the fixed object is acquired, the second gaze information corresponding to the first gaze information can be determined according to the relative parameter, then the gaze information of the user relative to the fixed object is obtained, and further, when the fixed object is a vehicle such as a car or interior equipment of the car, and the user is the driver, the second gaze information can accurately indicate the line of sight of the driver relative to the vehicle, the technical effect of accurately determining the line of sight of the driver is achieved, thereby solving the technical problem that the line of sight of the driver cannot be accurately determined in the prior art.

BRIEF DESCRIPTION OF THE DRAWINGS

The drawings described herein are provided to provide a further understanding of the present disclosure and constitute a part of the present application. The illustrative embodiments of the present disclosure and the description thereof are intended to explain the present disclosure and are not intended to limit the present disclosure. In the drawings.

DESCRIPTION OF EMBODIMENTS

The technical solutions in the embodiments of the present disclosure are clearly and completely described in the following with reference to the accompanying drawings in the embodiments of the present disclosure. Obviously, the described embodiments are only a part of the embodiments of the present disclosure, and not all of the embodiments. All other embodiments obtained by those skilled in the art based on the embodiments of the present disclosure without creative efforts shall fall within the scope of protection of the present disclosure.

It is to be understood that the terms "first", "second" and the like in the specification and claims of the present disclosure are used to distinguish similar objects, and are not necessarily used to describe a particular order or sequence. It is to be understood that the data so used may be interchanged where appropriate, so that the embodiments of the present disclosure described herein can be implemented in a sequence other than those illustrated or described herein. In addition, the terms "including" and "having" and any variants thereof are intended to cover a non-exclusive inclusion. For example, a process, method, system, product, or device that includes a series of steps or units is not necessarily limited to those steps or units that are clearly listed, but may include other steps or units that are not explicitly listed or inherent to the process, method, product, or device.

In accordance with embodiments of the present disclosure, an embodiment of a method for determining line of sight is provided. It should be noted that the steps illustrated in the flowchart of the accompanying drawings may be executed in a computer system such as a set of computer executable instructions, and, although logical sequences are shown in the flowcharts, in some cases the steps shown or described may be performed in a different order than the ones described herein.

The terms "apparatus" and "device" are used to make distinction in the description, and these two terms may be used interchangeably.

Figure 1:
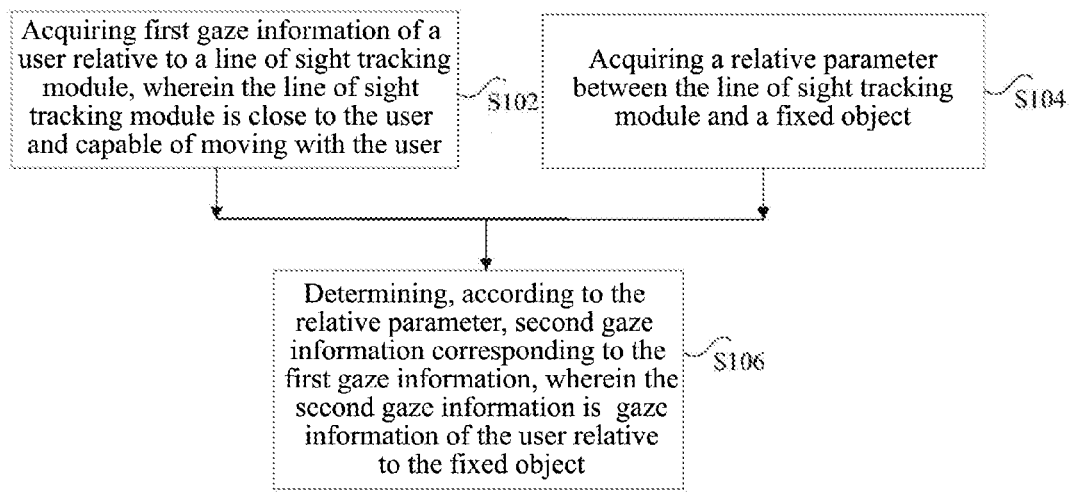
FIG. 1 is a flow chart of a method for determining line of sight according to an embodiment of the present disclosure.

FIG. 1 is a flow chart of a method for determining line of sight according to an embodiment of the present disclosure. As shown in FIG. 1, the method includes the following steps:

Step S102, acquiring first gaze information of a user relative to a line of sight tracking module, where the line of sight tracking module is close to the user and capable of moving with the user;

Step S104, acquiring a relative parameter between the line of sight tracking module and a fixed object; and Step S106, determining, according to the relative parameter, second gaze information corresponding to the first gaze information, where the second gaze information is gaze information of the user relative to the fixed object.

In an embodiment of the present disclosure, the line of sight tracking module is close to the user and capable of moving with the user, the first gaze information of the user relative to the line of sight tracking module is acquired, and the relative parameter between the line of sight tracking module and the fixed object is acquired, the second gaze information corresponding to the first gaze information can be determined according to the relative parameter, then the gaze information of the user relative to the fixed object is obtained, and further, when the fixed object is a vehicle such as a car, and the user is the driver, the second gaze information can accurately indicate the line of sight of the driver relative to the vehicle, the technical effect of accurately determining the line of sight of the driver is achieved, thereby solving the technical problem that the line of sight of the driver cannot be accurately determined in the prior art.

It should be noted that the fixed object may be a vehicle such as a car, or interior equipment such as a head up display (HUD), a central console, a dashboard, a steering wheel, a rearview mirror, etc., or may be a closed space such as a room. In the case that the fixed object is a vehicle, the user is the driver of the vehicle. In the solution provided in step S102, the gaze information includes, but is not limited to, the line of sight and the gaze point of the user, where the gaze information includes: the first gaze information and the second gaze information.

In an embodiment, the line of sight tracking module is configured to collect eyeball information such as a picture of the user's eyeball, and then determine the line of sight, the gaze point and gaze depth of the user according to eyeball information.

In an embodiment, the line of sight tracking module may be a wearable eye tracker. The user can obtain the first gaze information of the user through the glasses tracker, e.g., by wearing the wearable eye tracker.

It should be noted that the wearable eye trackers are kinds of optical measuring device, which are well known, see for example U.S. Patent Application Publication Number 2015/0062322 which describes a wearable eye tracking device, U.S. Pat. No. 9,107,622. The entire contents of the aforementioned applications are hereby incorporated by reference, for all purposes, as if fully set forth herein.

In an embodiment, the line of sight tracking module can move with the head of the user, and the head parameters such as the position, rotation angle, and tilt angle of the user's head can be indirectly determined according to the line of sight tracking module.

In the solution provided in step S104, the relative parameter includes: relative position information between the line of sight tracking module and the fixed object, and coordinate transformation angle information of the line of sight tracking module relative to the fixed object.

In an embodiment, the position of the line of sight tracking module relative to the fixed object can be determined according to the relative parameter. Since the line of sight tracking module can move with the head of the user, the head parameters of the head of the user can be further determined through the relative parameter.

For example, in the case where the fixed object is a car, the relative position of the head of the user relative to the car, and the rotation and tilt angle of the head may be indicated according to the relative parameter.

As an embodiment, the determining, according to the relative parameter, the second gaze information corresponding to the first gaze information includes: determining a first reference system of the first gaze information, where the first reference system is configured to indicate line of sight of the user relative to the line of sight tracking module; converting the first reference system to a second reference system according to the relative parameter, where the second reference system is configured to indicate line of sight of the user relative to the fixed object; and determining, according to the second reference system, the second gaze information corresponding to the first gaze information.

In the above embodiments of the present disclosure, the first reference system is a reference system established based on the line of sight tracking module, the first gaze information acquired by the line of sight tracking module is gaze information based on the first reference system, the line of sight of the user relative to line of sight tracking module may be indicated through the first reference system. Since the relative relationship between the line of sight tracking module and the fixed object may be indicated by the relative parameter, the first reference system can be converted according to the relative parameter, then the second reference system configured to indicate the line of sight of the user relative to fixed object is obtained, and in turn the first gaze information based on the first reference system can be converted into the second gaze information based on the second reference system.

As an example, the reference system can be defined in advance, that is, the first reference system is defined as $W_1$, and the second reference system is defined as $W_2$. It is known that the first gaze information is indicated as $V_1$ in the first reference system $W_1$, and an eyeball center is indicated as first eyeball position $C_1$ in the first reference system $W_1$. The relationship between the first reference system $W_1$ and the second reference system $W_2$ is determined. For example, a spatial position G and an orientation $V_g$ of the line of sight tracking module in the second reference system $W2$ can be acquired by an image sensor on a dashboard. The reference system transformation matrix W of the first reference system $W1$ and the second reference system $W2$ can be obtained according to the spatial position G and the orientation $V_g$. Let $C_1'=[C_1\ 1]^T$, $C_2'=[C_2 1]^T$, $V_1'=[V_1 1]^T$ and $V_2'=[V_2 1]^T$, $C2'$ and $V2'$ can be obtained according to the predetermined relationship $C_2'=WC_1'$ and $V_2'=WV_1'$, and in turn the second eyeball position $C_2$ and the second gaze information $V_2$ in the second reference system $W_2$ are obtained.

In an embodiment, the first reference system can be translated and rotated according to the relative parameter to achieve the reference system conversion between the first reference system and the second reference system.

It should be noted that the reference system converting is a coordinate system converting, the first reference system may also be referred to a first coordinate system, and second reference system may also be referred to a second coordinate system, the first reference system and the second reference system can be a three-dimensional spatial coordinate system established by the line of sight tracking module.

In an embodiment, the relative parameter can be represented by a predetermined matrix, by which the conversion can be performed between the first reference system and the second reference system, thereby the second gaze information corresponding to the first gaze information is determined.

As an embodiment, after the determining, according to the relative parameter, second gaze information corresponding to the first gaze information, the method further includes: determining whether the relative parameter and/or the second gaze information meets a predetermined condition; and determining, if the relative parameter and/or the second gaze information does not meet the predetermined condition, that a posture of the user is incorrect, and generating a corresponding emergency command, where the emergency command is configured to control the fixed object.

It should be noted that the predetermined condition is used to determine whether the posture of the user is correct, when the relative parameter, the second gaze information, or both the relative parameter and the second gaze information do not meet the predetermined condition, the posture of the user can be determined to be incorrect, thereby generating the emergency command, and performing an emergency control on the fixed object according to the emergency command.

In an embodiment, in the case that the fixed object is a vehicle and the user is a driver, if the posture of the driver is incorrect, the vehicle may be subjected to the emergency control according to an emergency instruction to avoid danger.

In an embodiment, the emergency command includes: a prompt command, configured to control the vehicle to send a prompt message to remind the driver, for example, the sound and light alarm device may be used to prompt the driver that the current driving posture does not meet the predetermined condition, and urge the driver to correct the driving posture.

In an embodiment, the emergency command includes an automatic driving command, and a current driving mode of the vehicle is automatically switched to an automatic driving mode to control the automatic driving of the vehicle if the driving posture of the driver is incorrect.

In an embodiment, the emergency command includes a braking command, and the vehicle can control the vehicle to perform an emergency braking according to the braking command if the driving posture of the driver is incorrect.

As an embodiment, the determining whether the relative parameter and/or the second gaze information meets a predetermined condition includes at least one of: determining, according to the relative parameter, whether the user is in a first predetermined area, where determining, if the user is not in the first predetermined area, that the relative parameter does not meet the predetermined condition; counting a first duration that the user is not in the first predetermined area and determining whether the first duration is higher than a first time threshold according to the relative parameter, where determining, if the first duration is higher than the first time threshold, that the relative parameter does not meet the predetermined condition; determining, according to the second gaze information, whether line of sight of the user is in a second predetermined area, where determining, if the line of sight of the user is not in the second predetermined area, that the second gaze information does not meet the predetermined condition; and counting a second duration that the line of sight of the user is not in the second predetermined area and determining whether the second duration is higher than a second time threshold according to the second gaze information, where determining, if the second duration is higher than the second time threshold, that the second gaze information does not meet the predetermined condition.

It should be noted that in the case of the fixed object is a car, the first predetermined area can be an area where the body (such as the head) should be in a state where the driver is driving the car correctly; and the second predetermined area can be an area where the line of sight or the gaze point of the driver with respect to the car should be in a state where the driver is driving the car correctly.

In an embodiment, the position of the user's head relative to the fixed object can be determined according to the relative parameter, thereby determining whether the user's head is in the first predetermined area. When the user's head is in the first predetermined area, it can be determined that the relative parameter meets the predetermined condition, that is, it is determined that the posture of the user is correct; and when the user's head is not in the first predetermined area, it is determined that the relative parameter does not meet the predetermined condition, that is, it is determined that the posture of the user is incorrect.

For example, in the case that the fixed object is a vehicle and the user is a driver, if the driver is not in the driving position, such as stoop to pick something up, it is determined that the posture of the driver is incorrect.

In an embodiment, the first duration that the user's head is not in the first predetermined area can be counted according to the relative parameter, thereby determining whether the first duration is higher than the first time threshold. When the first duration is not higher than the first time threshold, it may be determined that the relative parameter meets the predetermined condition, that is, it is determined that the posture of the user is correct; and when the first duration is higher than the first time threshold, it is determined that the relative parameter does not meet the predetermined condition, that is, it is determined that the posture of the user is incorrect.

In an embodiment, the first time threshold may be set to 10 seconds. When the fixed object is the vehicle and the user is the driver, if the driver is not in the driving position, such as stoop to pick something up for more than 10 seconds, it is determined that the posture of the driver is incorrect.

In an embodiment, the line of sight of the user relative to fixed object can be determined according to second gaze information, thereby determining whether the line of sight of the user is in the second predetermined area. When the line of sight of the user is in the second predetermined area, it can be determined that the second gaze information meets the predetermined condition, that is, it is determined that the posture of the user is correct; and when the line of sight of the user is not in the second predetermined area, it can be determined that the second gaze information does not meet the predetermined condition, that is, it is determined that the posture of the user is incorrect.

For example, in the case that the fixed object is a vehicle and the user is a driver, if the driver turns back, or bows, it is determined that the line of sight of the driver is not in the second predetermined area, and it is determined that the posture of the user is incorrect.

In an embodiment, the second duration that the line of sight of the user is not in the second predetermined area may be counted according to the second gaze information, thereby determining whether the second duration is higher than the second time threshold. In the case that the second duration is not higher than the second time threshold, it can be determined that the second gaze information meets the predetermined condition, that is, it is determined that the posture of the user is correct; and in the case that the second duration is higher than the second time threshold, it can be determined that the second gaze information does not meet the predetermined condition, that is, it is determined that the posture of the user is incorrect.

In an embodiment, the second time threshold can be set to 10 seconds, in the case that the fixed object is a vehicle and the user is a driver, if the driver turns back, or bows, it is determined that the line of sight of the driver is not in the second predetermined area for more than 10 seconds, and it is determined that the posture of the driver is incorrect.

As an embodiment, after the determining, according to the relative parameter, second gaze information corresponding to the first gaze information, the method further includes: determining, according to the second gaze information, a gaze point of the user; and generating, according to the gaze point, a gaze point control command, where the gaze point control command is configured to control the fixed object.

According to the above embodiments of the present disclosure, the gaze point of the user relative to the fixed object can be determined according to second gaze information. For example, in the case that the fixed object is a car and the user is a driver, the gaze point, such as a mirror, a rear view mirror, a center console, a display gazed by the driver, etc., of the driver relative to the car can be determined according to second gaze information, thereby generating the corresponding gaze point control command according to the gaze point of the driver, and controlling the car according to the gaze point control command. For example, if the driver gazes the display, the display can be illuminated according to the gaze point control command.

In an embodiment, in the case that the fixed object is a car and the target object is a driver, and the car is equipped with an eye-controlled display device, the gaze point of the driver relative to the car can be determined according to the second gaze information of the driver, and in turn, in the case that the gaze point is located on the eye-controlled display device, the corresponding gaze point control command is generated according to the position of the gaze point on the eye-controlled display device, thereby realizing eye-movement control of the car. Specifically, the technical solution of the present application does not require manual operation, and the driver or user can control the vehicle through their eyes, which is fast and convenient.

According to another embodiment of the present disclosure, a storage medium is further provided, the storage medium includes a stored program, where the program, when it is running, performs the method for determining line of sight or a vehicle based method for determining line of sight described any one of above.

According to another embodiment of the present disclosure, a processor is further provided, the processor is configured to run a program, where the program, when it is executed, performs the method for determining line of sight or the vehicle based method for determining line of sight described above.

According to an embodiment of the present disclosure, an embodiment of an apparatus for determining line of sight is further provided, it should be noted that the apparatus for determining line of sight can perform the method for determining line of sight in the embodiments of present disclosure. The method for determining line of sight in the embodiments of present disclosure can be performed in the apparatus for determining line of sight.

Figure 2:
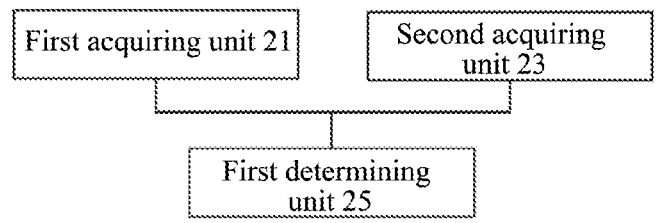
FIG. 2 is a schematic diagram of an apparatus for determining line of sight according to an embodiment of the present disclosure.

FIG. 2 is a schematic diagram of an apparatus for determining line of sight according to an embodiment of the present disclosure, as shown in FIG. 2, the apparatus includes:

a first acquiring unit 21, configured to acquire first gaze information of a user relative to a line of sight tracking module, where the line of sight tracking module is close to the user and capable of moving with the user; a second acquiring unit 23, configured to acquire a relative parameter between the line of sight tracking module and a fixed object; and a first determining unit 25, configured to determine, according to the relative parameter, second gaze information corresponding to the first gaze information, where the second gaze information is gaze information of the user relative to the fixed object.

It should be noted that the first acquiring unit 21 in the present embodiment may be used to perform step S102 in the embodiment of the present application, the second acquiring unit 23 in the present embodiment may be used to perform step S104 in the embodiment of the present application, and the first determining unit 25 in the present embodiment may be used to perform step S106 in the embodiment of the present application. The above modules are the same as the examples and application scenarios implemented by the corresponding steps, but are not limited to the contents disclosed in the above embodiments.

In the embodiments of the present disclosure, the line of sight tracking module is close to the user and capable of moving with the user, the first gaze information of the user relative to the line of sight tracking module is acquired, and the relative parameter between the line of sight tracking module and the fixed object is acquired, the second gaze information corresponding to the first gaze information can be determined according to the relative parameter, then the gaze information of the user relative to the fixed object is obtained, and further, when the fixed object is a vehicle such as a car, and the user is the driver, the second gaze information can accurately indicate the line of sight of the driver relative to the vehicle, the technical effect of accurately determining the line of sight of the driver is achieved, thereby solving the technical problem that the line of sight of the driver cannot be accurately determined in the prior art.

As an embodiment, the relative parameter includes: relative position information between the line of sight tracking module and the fixed object, and coordinate transformation angle information of the line of sight tracking module relative to the fixed object.

As an embodiment, the first determining unit includes: a first determining module, configured to determine a first reference system of the first gaze information, where the first reference system is configured to indicate line of sight of the user relative to the line of sight tracking module; a converting module, configured to convert the first reference system to a second reference system according to the relative parameter, where the second reference system is configured to indicate line of sight of the user relative to the fixed object; and a second determining module, configured to determine, according to the second reference system, the second gaze information corresponding to the first gaze information.

As an embodiment, the apparatus further includes: a judging unit, configured to, after the determining, according to the relative parameter, second gaze information corresponding to the first gaze information, determine whether the relative parameter and/or the second gaze information meets a predetermined condition; and a second determining unit, configured to determine, if the relative parameter and/or the second gaze information does not meet the predetermined condition, that a posture of the user is incorrect, and generating a corresponding emergency command, where the emergency command is configured to control the fixed object.

As an embodiment, the second determining unit includes at least one of: a first judging module, configured to determine, according to the relative parameter, whether the user is in a first predetermined area, where determining, if the user is not in the first predetermined area, that the relative parameter does not meet the predetermined condition; a second judging module, configured to count a first duration that the user is not in the first predetermined area and determining whether the first duration is higher than a first time threshold according to the relative parameter, where determining, if the first duration is higher than the first time threshold, that the relative parameter does not meet the predetermined condition; a third judging module, configured to determine, according to the second gaze information, whether line of sight of the user is in a second predetermined area, where determining, if the line of sight of the user is not in the second predetermined area, that the second gaze information does not meet the predetermined condition; and a fourth judging module, configured to count a second duration that the line of sight of the user is not in the second predetermined area and determining whether the second duration is higher than a second time threshold according to the second gaze information, where determining, if the second duration is higher than the second time threshold, that the second gaze information does not meet the predetermined condition.

As an embodiment, the apparatus further includes: a third determining unit, configured to determine, according to the second gaze information, a gaze point of the user; and a generating unit, configured to generate, according to the gaze point a gaze point control instruction, where the gaze point control instruction is configured to control the fixed object.

Figure 3:
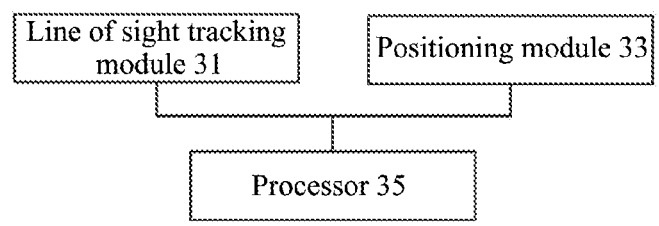
FIG. 3 is a schematic diagram of a wearable eye movement device according to an embodiment of the present disclosure.

FIG. 3 is a schematic diagram of a wearable eye movement device according to an embodiment of the present disclosure, as shown in FIG. 3, the device includes: a line of sight tracking module 31, configured to acquire the first gaze information of the user relative to the line of sight tracking module, the line of sight tracking module is close to the user and capable of moving with the user; a positioning module 33, configured to acquire a relative parameter between the line of sight tracking module and the fixed object; and a processor 35, configured to determine a second gaze information corresponding to the first gaze information according to the relative parameter, where the second gaze information is the gaze information of the user relative to the fixed object.

In an embodiment of the present disclosure, the line of sight tracking module is close to the user and capable of moving with the user, the first gaze information of the user relative to the line of sight tracking module is acquired, and the relative parameter between the line of sight tracking module and the fixed object is acquired, the second gaze information corresponding to the first gaze information can be determined according to the relative parameter, then the gaze information of the user relative to the fixed object is obtained, and further, when the fixed object is a vehicle such as a car, and the user is the driver, the second gaze information can accurately indicate the line of sight of the driver relative to the vehicle, the technical effect of accurately determining the line of sight of the driver is achieved, thereby solving the technical problem that the line of sight of the driver cannot be accurately determined in the prior art.

Figure 4:
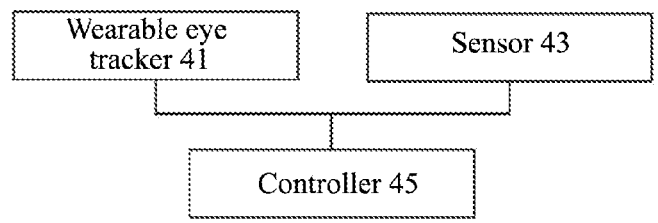
FIG. 4 is a schematic diagram of a system for determining line of sight according to an embodiment of the present disclosure.

FIG. 4 is a schematic diagram of a system for determining line of sight according to an embodiment of the present disclosure, as shown in FIG. 4, the system for determining line of sight includes: a wearable eye tracker 41, configured to acquire first gaze information of a user relative to the wearable eye tracker 41, where the wearable eye tracker 41 is close to the user and capable of moving with the user; a sensor 43, configured to acquire a relative parameter between the wearable eye tracker 41 and a fixed object; and a controller 45, configured to determine, according to the relative parameter, second gaze information corresponding to the first gaze information, where the second gaze information is gaze information of the user relative to the fixed object.

In the embodiments of the present disclosure, the wearable eye tracker is close to the user and capable of moving with the user, the first gaze information of the user relative to the wearable eye tracker is acquired, and the relative parameter between the wearable eye tracker and the fixed object is acquired, the second gaze information corresponding to the first gaze information can be determined according to the relative parameter, then the gaze information of the user relative to the fixed object is obtained, and further, when the fixed object is a vehicle such as a car, and the user is the driver, the second gaze information can accurately indicate the line of sight of the driver relative to the vehicle, the technical effect of accurately determining the line of sight of the driver is achieved, thereby solving the technical problem that the line of sight of the driver cannot be accurately determined in the prior art.

In an embodiment, the sensor can be disposed on the wearable eye tracker and the fixed object for communicating between the wearable eye tracker and the fixed object, and determining the relative parameter between the wearable eye tracker and the fixed object according to the communication condition.

In an embodiment, the controller can be a central control device (such as a center console) of a vehicle such as a car, and both the relative parameters transmitted by the sensor and the first gaze information acquired by the wearable eye tracker may be acquired by the controller, and the, and in turns, the second gaze information of the driver relative to the vehicle may be obtained by the controller according to the first gaze information and the relative parameter.

In an embodiment, the sensor can be an infrared sensor, an infrared camera and an infrared light can be respectively disposed on the wearable eye movement device and the vehicle, thereby determining the relative parameter of the wearable eye movement device relative to the fixed object according to the infrared camera and the infrared light.

As an embodiment, the controller is further configured to determine the gaze point of the user according to the second gaze information, the system for determining line of sight further includes: eye-controlled display device, configured to determine the gaze point control command corresponding to the gaze point in the case that the gaze point is located on the eye-controlled display device, where the gaze point control command is configured to control the vehicle.

It should be noted that the eye-controlled display device can be an eye-controlled display screen, and the area on which the eye-controlled display screen is located can be set in advance on the vehicle, it can be determined whether the gaze point of the driver is in the area on which the eye-controlled display screen is located according to the second gaze information.

In an embodiment, the eye-controlled display screen includes a plurality of instruction modules (such as virtual buttons), and in the case that the driver gazes a command module (such as a virtual button) which is determined by the gaze point, the gaze point control command corresponding to the instruction module (such as a virtual button) may be generated.

The present disclosure also provides a feasible embodiment, which provides a driving behavior monitoring vehicle/dangerous driving behavior warning method.

The present disclosure proposes to adopt the wearable eye tracker (that is, a device for acquiring the first gaze information, hereinafter referred to as "glasses") as a first level of line of sight detection, and on the basis of this, a second level of the line of sight detection is added, that is, a pair of transmitting or receiving means for determining the relative parameter of the glasses and the vehicle is added, to indirectly detect the relative parameter of the driver's head relative to the vehicle, and the line of sight of the driver relative to the vehicle by detecting the position of the glasses. Also, after the detection result is obtained, the behavior of the vehicle may be controlled using the detection result, such as braking.

The present disclosure, through the wearable eye tracker, can detect the eye-moving information of the driver in a close and high-reliability manner, and quantitatively evaluate and determine the gaze direction and the degree of fatigue, thereby realizing automatic warning and preventive intervention, and at the same time, when it is impossible to carry out the automatic driving, the driving right is given to the driver (if there is no sleep, no fatigue, etc.), thereby improving driving safety.

The technical solution provided by the present disclosure includes: a line of sight tracking device (such as the above "glasses") and a vehicle control device. The line of sight tracking device is used for monitoring the line of sight of the driver, and the vehicle control device is used for controlling the vehicle in response to a monitoring result of the "glasses".

The driver can wear an eye tracker (for example, the wearable eye tracker) "glasses", or other forms of a wearable line of sight tracking device, and can monitor the eye tracker through the "glasses" to detect the line of sight (i.e., the first gaze information) that the line of sight of the driver projected on the coordinate system of the "glasses". Here, the first level of the gaze tracking is implemented, and the monitoring result is only used for indicating that the line of sight of the driver on the coordinate system of the first reference system eye tracker is displayed, that is, only to indicate where the driver is looking at the "glasses".

In an embodiment, the sensor can be installed near the center console/steering wheel of the vehicle (or other location) to indirectly monitor the relative parameter of the driver's head through information interaction between the sensors and the "glasses".

In an embodiment, more than four infrared lights can be set as reference points on the eye tracker, and the sensor can be an infrared camera. Through the cooperation of the sensor and the "glasses", the relative parameter of the "glasses" relative to the vehicle can be determined by sensing the above reference points, thereby indirectly monitoring the parameters of the driver's head relative to the vehicle, achieving the second level sight tracking, the monitoring results of which are used for indicating the line of sight of the driver on the coordinate system in which the vehicle is located.

In the above embodiments of the present disclosure, according to the problem that the line of sight of the driver relative to the coordinate system of the vehicle is not known by using only one coordinate system in the prior art, the coordinate system (i.e., the second reference system) of the driver relative to the vehicle can be introduced by installing the sensor near the center console/steering wheel, thereby the line of sight of the driver can be accurately projected onto the vehicle, that is, the actual line of sight of the driver relative to the vehicle can be determined by the two-coordinate system.

In the above embodiments of the present disclosure, on the one hand, the driving behavior detection can be assisted by locating the position of the driver's head relative to the vehicle (e.g., determining the driver's movements, such as body tilt, stoop to pick something up, smoking, etc.). In addition, the line of sight of the driver can be accurately projected onto the coordinate system where the vehicle is located, to accurately determine the gaze point of the driver on the vehicle, and in turn, according to the gaze point, the driver can control the vehicle through the eye to realize the technical effect of eye-movement control of the vehicle.

In an embodiment, an eye-controlled display screen for controlling the vehicle can be disposed on the vehicle, and the eye-controlled display screen can display component, such as an air conditioner, an audio, a radio, etc., that is operable by the driver, and according to the gaze point of the driver, the driver can interact with the eye-controlled display screen to control the vehicle, such as turning on the air conditioner, adjusting the air-conditioning temperature, turning on the sound and the radio, selecting the played track or the radio station, etc.

In an embodiment, the combination of the above infrared camera and the infrared light may also be replaced by a combination of an infrared base station and an infrared receiver. In order to obtain a larger sensing area, the infrared base station can be disposed on the center console of the vehicle, and the infrared receiver can be disposed on the eye tracker, which can reduce the possibility that the head (eye tracker) exceeds the sensing range of the sensor.

It should be noted that the position where the sensor is disposed is not limited to the vicinity of the center console/steering wheel.

In an embodiment, the sensor can be disposed near the center console/steering wheel, and the infrared light is disposed on the eye tracker; and the sensor can also be disposed on the glasses, and the infrared light is disposed near the center console/steering wheel.

In an embodiment, the vehicle control device includes: a judging unit configured to determine a current state of the driver based on the detection result of the line of sight tracking device, and transmit the judging result to the central control unit of the vehicle, and the vehicle is controlled by the central control unit.

For example, when it is detected that the driver's head is deviated from the driving poster, and the line of sight of the driver is toward the lower part of the vehicle, there may be a driver's physical discomfort causing the body to tilt. In this case, the central control unit can, for example, perform emergency braking on the vehicle, or perform a stop on the side, and can also generate a tone/light warning.

The wearable eye tracker provided by the present disclosure has relatively mature technology is comfortable to wear, and can fit to most people wearing glasses; and the wearable eye tracker can moves with the driver's head, regardless of the posture of the driver, making the line of sight estimation more accurate.

The wearable eye tracker provided by the present disclosure can add a filter lens or a coating film, so that the effect of the wearable eye tracker is less interfered by ambient light, especially in the process of the vehicle driving (opposite headlights, direct sunlight, tunnel spotlights, bright and dark environments, etc.), the accuracy of the eye-moving detection can be improved.

The technical solution provided by the present disclosure can be applied to a vehicle, and since the vehicle itself can provide power and processing capability for the wearable eye tracker, the wearable eye tracker itself can be made small and light, easy to store (For example, it can be stored in the driver's seat head back, wired/wireless connection, wired charging/wireless charging).

In the technical solution provided by the present disclosure, a sensor (For example, the infrared camera and more than four infrared lights on the eye tracker, or infrared base station and infrared receiver on the eye tracker, etc.) may be installed near a center console/steering wheel of a vehicle (such as a car) as needed to detect the posture of the driver's head, where the sensor and the eye tracker form a system to determine the correct line of sight of the driver. Further, the relative parameter of the driver's head relative to the vehicle can also be positioned to assist in driving behavior detection (stoop to pick something up, smoking, etc.).

The wearable eye tracker provided by the present disclosure further includes: a bone conduction earphone, and an electroencephalogram detecting electrode.

In an embodiment, at least two electrodes of the electroencephalogram detection electrode can be in contact with the human body.

In the technical solution provided by the present disclosure, a marking device may be set in places where the driver frequently views, such as a car main rear view mirror, a left rear view mirror, a right rear view mirror, and the is configured to calibrate the line of sight estimation algorithm, complete the calibration of the line of sight (or gaze point), and ensure the accuracy of the line of sight (or gaze point).

In the technical solution provided by the present disclosure, a reminding device such as sound/light/steering wheel vibration/seat vibration is also included, where the reminding device is configured to generate reminding information according to the emergency command when the target object does not meet the predetermined condition.

The foregoing serial numbers of the embodiments of the present disclosure are merely for description, and do not represent the advantages and disadvantages of the embodiments.

In the above-mentioned embodiments of the present disclosure, the descriptions of the various embodiments are different, and the parts that are not detailed in a certain embodiment can be referred to the related descriptions of other embodiments.

In the several embodiments provided by the present application, it should be understood that the disclosed technical content may be implemented in other manners. The device embodiments described above are only schematic, for example, the division of unit can be divided by a logical function. In actual implementation, there may be another division. For example, multiple units or components can be combined or integrated into another system, or some features can be ignored, or not executed. In addition, the mutual coupling or direct coupling or communication connection shown or discussed may be an indirect coupling or communication connection through some interface, unit or module, and may be electrical or otherwise.

The units described as separate components may or may not be physically separated, and the components displayed as the unit may or may not be physical units, that is, may be located in one place, or may be distributed to multiple units. Some or all of the units can be selected to achieve the purpose of the solutions of this embodiment.

In addition, each function unit in each embodiment of the present disclosure may be integrated in one processing unit, or each unit may exist physically separately, or two or more units may be integrated in one unit. The above integrated unit can be implemented in the form of hardware or in the form of a software function unit.

The integrated unit can be stored in a computer readable storage medium if it is implemented as a software function unit and sold or used as a standalone product. Based on such understanding, the technical solution of the present disclosure, or the part of the technical solution of the present disclosure that contributes to the prior art, or all or part of the technical solution can be embodied in the form of a software product, and the computer software product is stored in a storage medium and includes a plurality of instructions for causing a computer device (which may be a personal computer, a server or a network device, etc.) to perform all or part of the steps of the various embodiments of the present disclosure. The foregoing storage medium includes: U disk, Read-Only Memory (ROM), Read-Only Memory (RAM), Random Access Memory (RAM), mobile hard disk, disk or optical disk, and other media that can store program code.

The above is only preferred embodiments of the present disclosure, and it should be noted that those skilled in the art can make several improvements and refinements without departing from the principles of the present disclosure. These improvements and refinements should also be considered as protection scope of the present disclosure.

What is claimed is:

1. A method for determining line of sight, comprising:
   acquiring first gaze information of a user relative to a line of sight tracking module, wherein the line of sight tracking module is close to the user and capable of moving with the user;
   acquiring a relative parameter between the line of sight tracking module and a fixed object; and
   determining a first reference system of the first gaze information, wherein the first reference system is configured to indicate line of sight of the user relative to the line of sight tracking module;
   converting the first reference system to a second reference system according to the relative parameter, wherein the second reference system is configured to indicate line of sight of the user relative to the fixed object, wherein the relative parameter comprises: relative position information between the line of sight tracking module and the fixed object, and coordinate transformation angle information of the line of sight tracking module relative to the fixed object; and
   determining, according to the second reference system, second gaze information corresponding to the first gaze information; wherein the second gaze information is gaze information of the user relative to the fixed object.

2. The method according to claim 1, wherein after the determining, according to the second reference system, second gaze information corresponding to the first gaze information, the method further comprises:
   determining whether at least one of the relative parameter and the second gaze information meets a predetermined condition; and
   determining, if at least one of the relative parameter and the second gaze information does not meet the predetermined condition, that a posture of the user is incorrect, and generating a corresponding emergency command, wherein the emergency command is configured to control the fixed object.

3. The method according to claim 2, wherein the determining whether at least one of the relative parameter and the second gaze information meets a predetermined condition comprises at least one of:
   determining, according to the relative parameter, whether the user is in a first predetermined area, wherein determining, if the user is not in the first predetermined area, that the relative parameter does not meet the predetermined condition;
   counting a first duration that the user is not in the first predetermined area and determining whether the first duration is higher than a first time threshold according to the relative parameter, wherein determining, if the first duration is higher than the first time threshold, that the relative parameter does not meet the predetermined condition;

determining, according to the second gaze information, whether line of sight of the user is in a second predetermined area, wherein determining, if the line of sight of the user is not in the second predetermined area, that the second gaze information does not meet the predetermined condition; and counting a second duration that the line of sight of the user is not in the second predetermined area and determining whether the second duration is higher than a second time threshold according to the second gaze information, wherein determining, if the second duration is higher than the second time threshold, that the second gaze information does not meet the predetermined condition.

4. The method according to claim 1, wherein after the determining, according to the second reference system, second gaze information corresponding to the first gaze information, the method further comprises:

determining, according to the second gaze information, a gaze point of the user; and generating, according to the gaze point, a gaze point control instruction, wherein the gaze point control instruction is configured to control the fixed object.

5. The method according to claim 2, wherein the fixed object comprises a vehicle, an interior equipment of a vehicle, or a closed space.

6. The method according to claim 5, wherein the fixed object is the vehicle, the emergency command is a prompt command, an automatic driving command, or a braking command, wherein the prompt command is configured to control the vehicle to send a prompt message when the posture of the user is incorrect, the automatic driving command is configured to control an automatic driving of the vehicle when the posture of the user is incorrect, and the braking command is configured to control the vehicle to perform an emergency braking when the posture of the user is incorrect.

7. The method according to claim 1, wherein the line of sight tracking module is a wearable eye tracker.

8. A processor, wherein the processor is configured to run a program, wherein the program, when it is executed, is configured to:

acquire first gaze information of a user relative to a line of sight tracking module, wherein the line of sight tracking module is close to the user and capable of moving with the user;

acquire a relative parameter between the line of sight tracking module and a fixed object; and determine a first reference system of the first gaze information, wherein the first reference system is configured to indicate line of sight of the user relative to the line of sight tracking module;

convert the first reference system to a second reference system according to the relative parameter, wherein the second reference system is configured to indicate line of sight of the user relative to the fixed object, wherein the relative parameter comprises: relative position information between the line of sight tracking module and the fixed object, and coordinate transformation angle information of the line of sight tracking module relative to the fixed object; and determine, according to the second reference system, the second gaze information corresponding to the first gaze information; wherein the second gaze information is gaze information of the user relative to the fixed object.

9. The processor according to claim 8, wherein the processor is further configured to:

determine whether at least one of the relative parameter and the second gaze information meets a predetermined condition; and determine, if at least one of the relative parameter and the second gaze information does not meet the predetermined condition, that a posture of the user is incorrect, and generating a corresponding emergency command, wherein the emergency command is configured to control the fixed object.

10. The processor according to claim 9, wherein the processor is further configured to perform at least one of:

determine, according to the relative parameter, whether the user is in a first predetermined area, wherein determine, if the user is not in the first predetermined area, that the relative parameter does not meet the predetermined condition;

count a first duration that the user is not in the first predetermined area and determine whether the first duration is higher than a first time threshold according to the relative parameter, wherein determine, if the first duration is higher than the first time threshold, that the relative parameter does not meet the predetermined condition;

determine, according to the second gaze information, whether line of sight of the user is in a second predetermined area, wherein determine, if the line of sight of the user is not in the second predetermined area, that the second gaze information does not meet the predetermined condition; and count a second duration that the line of sight of the user is not in the second predetermined area and determine whether the second duration is higher than a second time threshold according to the second gaze information, wherein determine, if the second duration is higher than the second time threshold, that the second gaze information does not meet the predetermined condition.

11. The processor according to claim 8, wherein the processor is further configured to:

determine, according to the second gaze information, a gaze point of the user; and generate, according to the gaze point, a gaze point control instruction, wherein the gaze point control instruction is configured to control the fixed object.

12. The processor according to claim 9, wherein the fixed object comprises a vehicle, an interior equipment of a vehicle, or a closed space.

13. The processor according to claim 12, wherein the fixed object is the vehicle, the emergency command is a prompt command, an automatic driving command, or a braking command, wherein the prompt command is configured to control the vehicle to send a prompt message when the posture of the user is incorrect, the automatic driving command is configured to control an automatic driving of the vehicle when the posture of the user is incorrect, and the braking command is configured to control the vehicle to perform an emergency braking when the posture of the user is incorrect.

14. The processor according to claim 8, wherein the line of sight tracking module is a wearable eye tracker.

15. A system for determining line of sight, comprising:

a wearable eye tracker, configured to acquire first gaze information of a user relative to the wearable eye tracker, wherein the wearable eye tracker is close to the user and capable of moving with the user;

a sensor, configured to acquire a relative parameter between the wearable eye tracker and a fixed object; and a controller, configured to determine a first reference system of the first gaze information, wherein the first reference system is configured to indicate line of sight of the user relative to the line of sight tracking module;

convert the first reference system to a second reference system according to the relative parameter, wherein the second reference system is configured to indicate line of sight of the user relative to the fixed object, wherein the relative parameter comprises: relative position information between the line of sight tracking module and the fixed object, and coordinate transformation angle information of the line of sight tracking module relative to the fixed object; and determine, according to the second reference system, second gaze information corresponding to the first gaze information; wherein the second gaze information is gaze information of the user relative to the fixed object.

16. A non-transitory computer readable storage medium, storing thereon a program, when being executed by a processor, causing the processor to perform the method for determining line of sight according to claim 1.

* * * * *